United States Patent
Young et al.

[15] 3,694,768
[45] Sept. 26, 1972

[54] LASER HAVING MEANS FOR ENHANCING THE TEM MODE OUTPUT THEREOF

[72] Inventors: Donald S. Young, Windham; William C. Fricke, Milford, both of N.H.

[73] Assignee: Sanders Associates, Inc., Nashua, N.H.

[22] Filed: Oct. 12, 1970

[21] Appl. No.: 80,090

[52] U.S. Cl. ............331/94.5, 250/199, 350/161
[51] Int. Cl. .........................................H01s 3/10
[58] Field of Search .......331/94.5; 280/199; 350/161

[56] References Cited

UNITED STATES PATENTS

| 3,297,876 | 1/1967 | De Maria | 250/199 |
| 3,412,251 | 11/1968 | Hargrove | 250/199 |

OTHER PUBLICATIONS

Danielmeyer et al., Applied Physics Lett. 16, 1970, p. 124

Rabson et al., IEEE Annual SW Conf. & Exhib. 22d, Dallas, Texas April 22–24, 1970, pp. 536–40.

*Primary Examiner*—Ronald L. Wibert
*Assistant Examiner*—R. J. Webster
*Attorney*—Louis Etlinger

[57] ABSTRACT

A transverse acoustic wave is applied to a fused silica cell disposed within a laser cavity to thereby change the optical path length of the laser cavity. $TEM_{\infty}$ mode efficiency is improved by increasing the number of atoms in the active laser medium which contribute to the axial mode.

9 Claims, 1 Drawing Figure

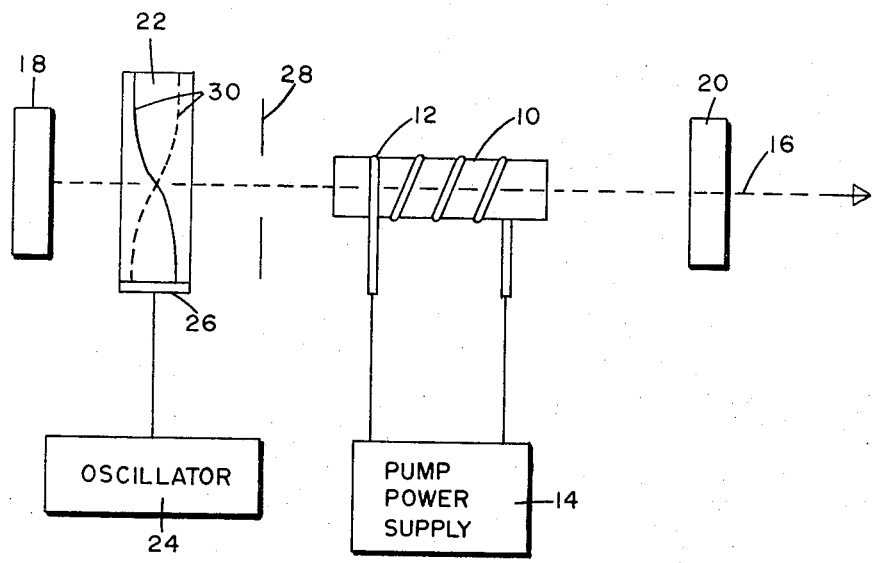

LASER HAVING MEANS FOR ENHANCING THE TEM MODE OUTPUT THEREOF

BACKGROUND OF THE INVENTION

1. Field of the Invention

The present invention relates generally to the field of lasers and more particularly to apparatus for enhancing the $TEM_{000}$ mode output of lasers.

2. Description of Prior Art

The resonant cavity of a conventional laser is of very high order, i.e. the cavity dimensions are very much larger than the emitted radiation wavelength. Such lasers are thus multimode devices in that there are a number of frequencies which correspond to the various longitudinal and transverse oscillation modes. Prior to the present invention the generation of $TEM_{000}$ longitudinal modes in a laser usually involved placing an aperture in the resonant cavity to provide a high loss for all but the $TEM_{000}$ mode in addition to an etalon to obtain a single frequency. Although this approach may provide an improvement in the mode purity of the laser output radiation it also involved a loss of 80–90 percent of the CW power available. This loss resulted from the prevention of atoms in the homogeneously broadened laser transition at the nodal planes of the axial modes from contributing to the off axis modes. If these atoms may be made to contribute to the axial mode then higher $TEM_{000}$ mode efficiencies may be achieved. One method of providing this capacity was to physically move the active laser medium relative to the resonant cavity by suspending the medium on an air cushion and optical bench. This method, however, provided movement which could only be maintained for a period of about ten milliseconds and presented very difficult problems in aligning the active medium with the resonant cavity reflectors.

OBJECTS AND SUMMARY OF THE INVENTION

From the foregoing discussion it will be understood that among the various objectives of the present invention are:

To provide a new and novel apparatus for enhancing the $TEM_{000}$ mode output of a laser.

To provide apparatus of the above described character having no requirement for moving parts.

To provide apparatus of the above described character which introduces minimal degradation of the laser power output.

To provide apparatus of the above described character wherein the resonant cavity is shifted relative to the atoms of the active laser medium.

To provide apparatus of the above described character using an acousto-optic cell in the laser resonant cavity.

These and other objectives of the present invention are efficiently attained by providing an acousto-optic cell within the laser resonant cavity. A transverse acoustic standing wave is set up in the cell which operates to change the optical path length of the resonant cavity at a preselected rate and thereby increase the number of atoms in the active laser medium which contribute to the axial oscillation mode thus increasing the $TEM_{000}$ mode efficiency.

The foregoing as well as other objects, features and advantages of the present invention will become more apparent from the following detailed description taken in conjunction with the appended drawing.

BRIEF DESCRIPTION OF THE DRAWING

The sole appended FIGURE is a schematic view of a laser incorporating the improvement according to the present invention.

DESCRIPTION OF PREFERRED EMBODIMENT

Turning now to the appended drawing there is illustrated an active laser medium 10 such as for example an yttrium-aluminum-garnet (YAG) rod. A pump lamp 12 driven by a conventional power source 14 is illustrated schematically as being helically disposed about the active medium 10. The active medium 10 is disposed along the longitudinal axis 16 of a resonant cavity defined by a totally reflective mirror 18 and a partially reflective output mirror 20. Also disposed within the resonant cavity is an acousto-optic cell 22 such as a quartz block which is transparent to the output radiation wavelength of the laser. An oscillator 24 is coupled via a piezoelectric transducer 26 to the acousto-optic cell 22. An aperture plate 28 is also disposed in the cavity between the electro-acoustic cell 22 and the active laser medium 10 with the aperture disposed on the longitudinal axis 16.

According to the principles of the present invention the optical path length of the resonant cavity is changed at a preselected rate by changing the index of refraction of the acousto-optic cell 22. To accomplish this a transverse acoustic standing wave schematically illustrated at 30 is set up in the acousto-optic cell 22. The transverse dimension of the acousto-optic cell 22 thus must be equal to a half wavelength of the acoustic wave. The frequency of the acoustic wave and thus the dimension of the cell 22 is selected such that it is large enough to generate the desired rate of change in the optical path length but low enough that the index of refraction of the cell 22 is substantially constant at any instant in time across the diameter of the laser beam.

By way of illustration, one embodiment of the present invention includes a one quarter inch by 3 inch cylindrical neodymium doped YAG laser rod and a crystalline quartz acousto-optic cell having a transverse dimension of approximately 5 centimeters and a thickness of 4 centimeters. The frequency of the oscillator signal applied to the electro-acoustic cell is 57 KHz which produced a transverse acoustic standing wave having a wavelength of 10 centimeters. The transverse mode is preferred in the practice of the present invention in order that the quartz cell does not become stress birefringent and thus introduce high losses. The laser beam diameter was 0.4 centimeter and the index of refraction of the electro-acoustic cell was found to be substantially constant over 96 percent of the beam diameter. The rate of change in optical path length provided by this apparatus was about 1 centimeter per second which was sufficient to provide an improvement in $TEM_{000}$ mode efficiency of more than 50 percent. It was found that this arrangement produced a substantial elimination of spatial hole burning at the anti-nodal planes of the $TEM_{000}$ mode laser.

It will thus be apparent that the applicants have provided apparatus which yields a significant improvement in $TEM_{000}$ mode efficiency over that available in the prior art. Since certain changes in the above described construction will become apparent to those skilled in the art without departing from the scope of the invention it is intended that 'all matter contained in the foregoing discussion or shown in the appended illustration shall be taken as illustrative and not in a limiting sense.

Having described what is new and novel and desired to secure by Letters Patent, what is claimed is:

1. An improved laser including a resonant optical cavity, an active laser medium axially disposed within said cavity, means for pumping said active laser medium such that the emission of a beam of radiation therefrom is stimulated which beam oscillates within said resonant cavity, an aperture plate disposed within said cavity and having the aperture disposed on the longitudinal axis thereof for eliminating off-axis modes, and wherein said improvement comprises an acoustic-optic cell axially disposed within said resonant cavity, and means for producing a transverse acoustic standing wave in said acousto-optic cell to vary the index of refraction thereof at a preselected rate thereby providing a preselected rate of variation in the effective length of said resonant cavity such that a substantial elimination of spatial hole burning at the antinodal planes of the laser occurs, said acoustic wave having a frequency high enough such as to generate the desired rate of change in the optical path length but low enough such that the index of refraction of said cell is substantially constant at any instant in time across the diameter of the laser beam.

2. Apparatus as recited in claim 1 wherein said acousto-optic cell is formed of fused silica.

3. Apparatus as recited in claim 1 wherein said acousto-optic cell is formed of fused silica.

4. Apparatus as recited in claim 1 wherein the transverse dimension of said acousto-optic cell is substantially equal to a half-wavelength of said acoustic wave.

5. Apparatus as recited in claim 1 wherein the frequency of said acoustic wave is sufficiently low that the index of refraction is substantially constant across the diameter of said beam of radiation.

6. Apparatus as recited in claim 1 wherein the rate of change of said effective length of said resonant cavity is at least 1 centimeter per second.

7. Apparatus as recited in claim 1 wherein said active laser medium is a neodymium doped yttrium-aluminum garnet rod, said acousto-optic cell is a crystalline quartz block having a transverse dimension of 5 centimeters, and said acoustic wave producing means includes an oscillator coupled to said acousto-optic cell and having an output frequency of substantially 57 kilohertz.

8. Apparatus as recited in claim 7 wherein said acoustic wave is in the transverse mode.

9. Apparatus as recited in claim 7 wherein the diameter of said beam of radiation from said rod is substantially 0.4 centimeter, said rate of change of said effective length of said resonant cavity is substantially 1 centimeter per second, and the index of refraction of said crystalline quartz block is substantially constant over at least 0.38 centimeter.

* * * * *